US008910947B2

(12) United States Patent
Voisine et al.

(10) Patent No.: US 8,910,947 B2

(45) Date of Patent: Dec. 16, 2014

(54) METHOD OF FORMING A SEAL ELEMENT

(75) Inventors: Donald Voisine, Terryville, CT (US); William Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 838 days.

(21) Appl. No.: 12/750,156

(22) Filed: Mar. 30, 2010

(65) Prior Publication Data

US 2011/0241295 A1 Oct. 6, 2011

(51) Int. Cl.

| | |
|---|---|
| ***F16J 15/18*** | (2006.01) |
| ***B21K 25/00*** | (2006.01) |
| ***F01D 11/00*** | (2006.01) |
| ***F01D 5/00*** | (2006.01) |
| ***F04D 29/08*** | (2006.01) |

(52) U.S. Cl.

CPC .............. *F01D 11/001* (2013.01); *F01D 5/005* (2013.01); *F04D 29/083* (2013.01); *F05D 2300/437* (2013.01); *F05D 2220/3217* (2013.01); *F05D 2250/182* (2013.01); *F05D 2230/90* (2013.01); *F05D 2260/36* (2013.01); *F05D 2300/431* (2013.01)

USPC ......................... 277/511; 29/889.21; 277/500

(58) Field of Classification Search

USPC ......... 277/409, 411, 412, 415, 421; 29/888.3, 29/889.21, 402.04, 402.05, 402.08, 402.19

See application file for complete search history.

(56) References Cited

U.S. PATENT DOCUMENTS

| | | | | |
|---|---|---|---|---|
| 3,053,694 | A * | 9/1962 | Daunt et al. | 427/230 |
| 3,092,306 | A * | 6/1963 | Eder | 415/173.4 |
| 3,823,950 | A * | 7/1974 | Pedersen | 277/415 |
| 3,843,278 | A * | 10/1974 | Torell | 415/173.4 |
| 4,207,024 | A * | 6/1980 | Bill et al. | 415/173.4 |
| 4,460,185 | A * | 7/1984 | Grandey | 277/415 |
| 4,507,841 | A * | 4/1985 | Rickert | 29/402.08 |
| 4,924,581 | A * | 5/1990 | Jakobsen | 29/402.02 |
| 5,484,665 | A * | 1/1996 | Singh et al. | 428/661 |
| 5,655,701 | A | 8/1997 | Quattrocchi et al. | |
| 6,352,264 | B1 * | 3/2002 | Dalzell et al. | 277/415 |
| 2005/0274009 | A1 * | 12/2005 | Powers | 29/889.1 |

* cited by examiner

*Primary Examiner* — Gilbert Lee

(74) *Attorney, Agent, or Firm* — Miller, Matthias & Hull LLP

(57) ABSTRACT

A method is provided for forming a seal element on a substrate surface. A layer of base material is formed on the substrate surface and a plurality of crenellations are formed in the layer of base material prior to forming a layer of seal material on the crenellated layer of base material. The method may be applied to making an original seal element or to repairing an existing seal element. The resulting seal includes a layer of base material bonded to a substrate and having a plurality of crenellations formed in a face surface of the layer of a base material and a layer of a seal material bonded thereto, the seal material filling the crenellations.

13 Claims, 5 Drawing Sheets

METHOD OF FORMING A SEAL ELEMENT

FIELD OF THE INVENTION

This invention relates generally to axial flow rotary machines and, more particularly, to making an original or repairing a damaged seal element, such as an inner airseal on a stator assembly of a gas turbine engine.

BACKGROUND OF THE INVENTION

Gas turbine engines, such as those used to power modern aircraft or in industrial applications, are axial flow rotary machines. Gas turbine engines include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor. Air drawn into the engine passes axially through the compressor into the combustor wherein fuel is combusted in the air to generate and accelerate combustion gases that pass through the turbine and out the exhaust nozzle of the gas turbine engine. The combustion gases turn the turbine, which turns a shaft in common with the compressor to drive the compressor.

The compressor of the gas turbine engine includes a rotor assembly and a stator assembly disposed coaxially about an axis of rotation. The rotor assembly includes a series of axially spaced rotor stages mounted to a rotor shaft structure. Each rotor stage includes an array of airfoils, termed rotor blades, extending outwardly from and at circumferentially spaced intervals about the rotor shaft structure. The stator assembly includes an outer stator case that coaxially circumscribes the rotor assembly and includes a plurality of stator vane stages disposed at axially spaced intervals such that a stage of rotor blades extends outwardly axially aft of each stage of stator vanes to terminate in close proximity to the outer stator case of the stator assembly.

Each stator vane stage includes a plurality of circumferentially spaced stator vanes supported from the outer stator cases and extending inwardly to an inner stator case circumscribing and in close proximity with the rotor shaft structure. A circumferentially extending inner airseal is mounted to the inboard surface of the inner stator case of each stage of stator vanes. The inboard surface of the inner airseal in cooperation with a projecting structure on the rotor structure, such as a knife edge seal element, establishes the air seal at each stage of stator vanes. In conventional practice, for the hotter stages of the compressor, the inner airseal is typically made of an abradable material, such as a porous metal fiber, brazed to a substrate surface on the inboard end of the stator vanes. The use of porous metal fiber materials seals brazed to the substrate surface in the hotter stages of the compressor is necessary due to the higher air temperatures to which the inner airseal is exposed. However, in the cooler stages of the compressor, the inner airseal is typically made of an abradable material, such as an elastomeric material, adhesively bonded to a substrate surface on the inboard end of the stator vanes.

In operation, as the rotor shaft structure rotates, the knife edge seal element will contact and even cut sealing grooves into the surface of the inner airseal to minimize air leakage. Over time in operation, the seal material becomes worn down and it becomes necessary to restore the inner airseal to insure the integrity of the air seal and maintain efficient operation of the gas turbine engine. In the repair of inner airseals, certain repair techniques applicable to one type of abradable material may not be applicable to another type of abradable material as the process of brazing and the process of adhesive bonding are mutually exclusive processes based on processing temperatures required for each type of operation.

The conventional practice for repair of damage or worn inner airseals made of elastomeric material is to remove all of the elastomeric material of the inner airseal under repair, including all of the remaining undamaged and unworn elastomeric material to expose the underlying surface of the inner case and usually around the opening in the inner case through which the vane tips extend. The removal of the elastomeric material is performed by machining or abrasive blasting and requires precise control to avoid damage to the retaining clips which engage the respective tip portions of the roots of the stator vanes that extend inboardly through the inner case and/or damage to the surface of the inner case and the roots of the stator vanes. Generally, it is necessary to replace the exposed retaining clips even if not damaged during the machining process per se. More importantly, the position and alignment of the stator vanes needs to be re-established relative to the case datum. Once the original elastomeric material has been completely removed and the underlying surface of the inner case and the exposed root portions of the stator vanes are thoroughly cleaned, a new elastomeric seal element is applied in the same manner as during original equipment manufacture. Consequently, the current repair practice requires precise machining and intricate preparation, which is time consuming and labor intensive. This is particularly true for aluminum cases, which require special processing to prepare the surface for bonding if the base alloy is exposed during removal of the old abradable airseal.

SUMMARY OF THE INVENTION

In an aspect of the invention, a method is provided for forming a seal element on a substrate surface. A layer of base material is formed on the substrate surface and a plurality of crenellations are formed in the layer of base material prior to forming a layer of seal material on the crenellated layer of base material. The method may be applied to making an original seal element or to repairing an existing seal element.

In an embodiment, the step of providing a layer of a seal material on the crenellated layer of a base material comprises the step of forming the layer of a seal material in place on the layer of a base material having crenellations formed therein. The seal material may be self-adhering to the base material or a coating of an adhesive may be applied to an exposed surface of the layer of base material having crenellations formed therein.

In an aspect of the invention, a method is provided for repair of an inner airseal associated with a stator assembly on a gas turbine engine, the inner airseal having a circumferentially extending seal element formed of an original elastomeric material and having an axial width, the seal element having a sealing surface in a damaged or worn condition. The method includes the steps of: removing the damaged or worn material from the original elastomeric material while leaving behind a retained layer of original material; forming a plurality of crenellations in the retained layer of original elastomeric material; and applying a replacement layer of new elastomeric material to the retained layer of original elastomeric material having crenellations formed therein.

The step of applying a replacement layer of new material to the retained layer of original material having crenellations formed therein may include the steps of: applying a coating of an adhesive to an exposed surface of the retained layer of original material having crenellations formed therein; forming the replacement layer of new material on the adhesive coated surface of the retained layer of original material having crenellations formed therein; and providing a sealing surface on the replacement layer of new material replicating the sealing surface of the seal element in an undamaged and unworn condition. The step of forming the replacement layer of new material on the adhesive coated retained layer of original material having crenellations formed therein may include the step of molding a replacement layer of moldable material onto the adhesive coated surface of the retained layer of original material having crenellations formed therein. The plurality of crenellations may be formed in the retained layer of original material to extend generally axially across the width of the seal element. The plurality of crenellations may be formed by machining into the face surface of the retained layer of original material.

In an aspect of the invention, a seal having a seal element includes a layer of a base material bonded to a substrate and having a plurality of crenellations formed in a face surface of the layer of a base material and a layer of a seal material bonded to the face surface of the layer of base material having crenellations formed therein. The seal material fills the crenellations. The layer of a seal material may be self-adhering to the layer of a base material or an adhesive layer applied may be disposed between the layer of a seal material and the layer of a base material.

In an embodiment, the seal may comprise an inner airseal associated with a stator assembly of a gas turbine engine. The crenellated surface of the layer of base material provides an increased bonding surface area, as well as providing mechanical retention that contributes to a bond having improved anti-rotation resistance to circumferentially applied stress as is applied by the contact of the knife edge seal elements with the face of the seal element of the inner airseal. In an embodiment, the repaired seal may comprise a seal on a rotary machine.

BRIEF DESCRIPTION OF THE DRAWINGS

For a further understanding of the disclosure, reference will be made to the following detailed description of the disclosure which is to be read in connection with the accompanying drawing, where.

DETAILED DESCRIPTION OF THE INVENTION

Figure 1:
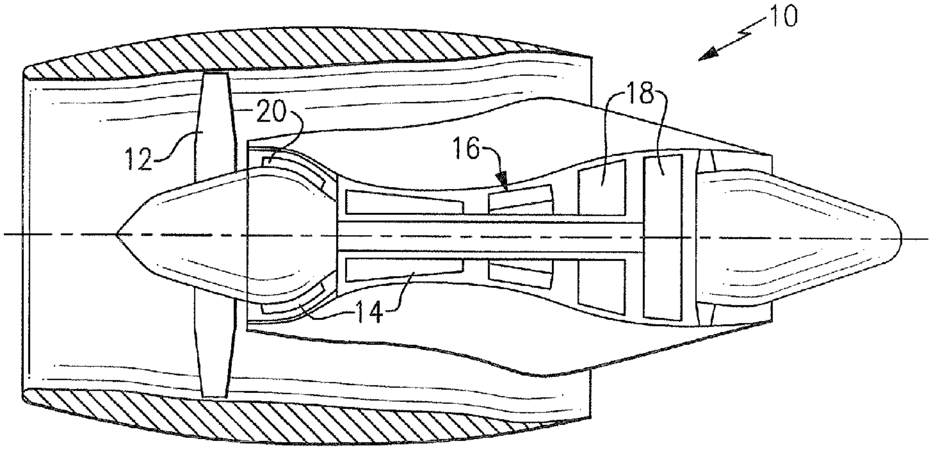
FIG. 1 is a schematic view of a longitudinal section of an exemplary embodiment of a turbofan gas turbine engine.

The method for making a seal element or repairing a damaged seal element associated with a seal on a rotary engine will be described with reference to a gas turbine engine. Referring initially to FIG. 1, there is depicted an exemplary embodiment of a turbofan gas turbine engine of the type commonly used to power large commercial aircraft, designated generally as 10. The turbofan gas turbine engine includes, from fore-to-aft longitudinally about a central engine axis, a fan 12, a compressor 14, a combustor module 16, and a turbine 18. It is to be understood that the method described herein is not limited in application to the depicted embodiment of a gas turbine engine, but is applicable to other types of gas turbine engines, including other types of aircraft gas turbine engines, industrial and power generation gas turbine engines, and other axial flow rotary machines.

Figure 3:
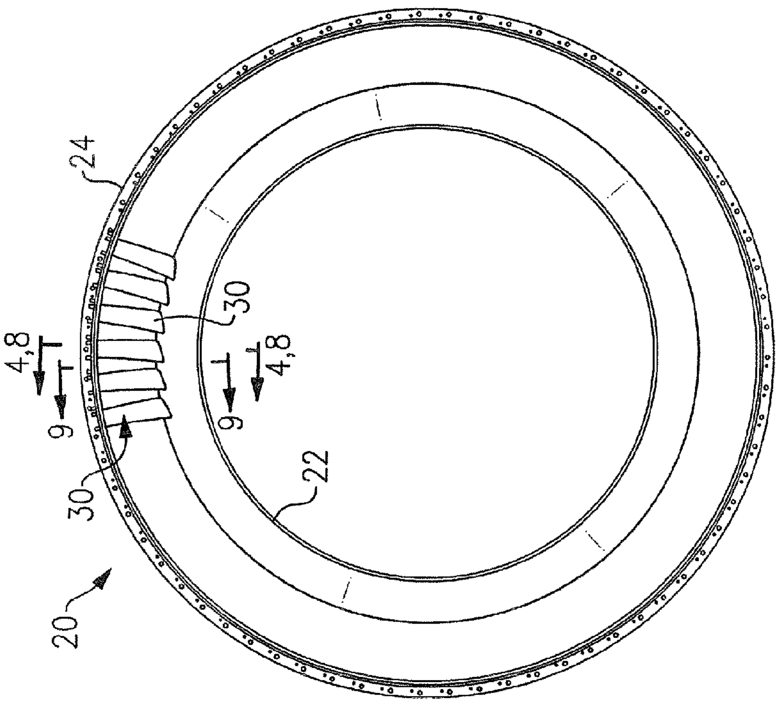
FIG. 3 is a front elevation view of the stator assembly of FIG. 2 looking aftwardly into stator assembly.
Figure 2:
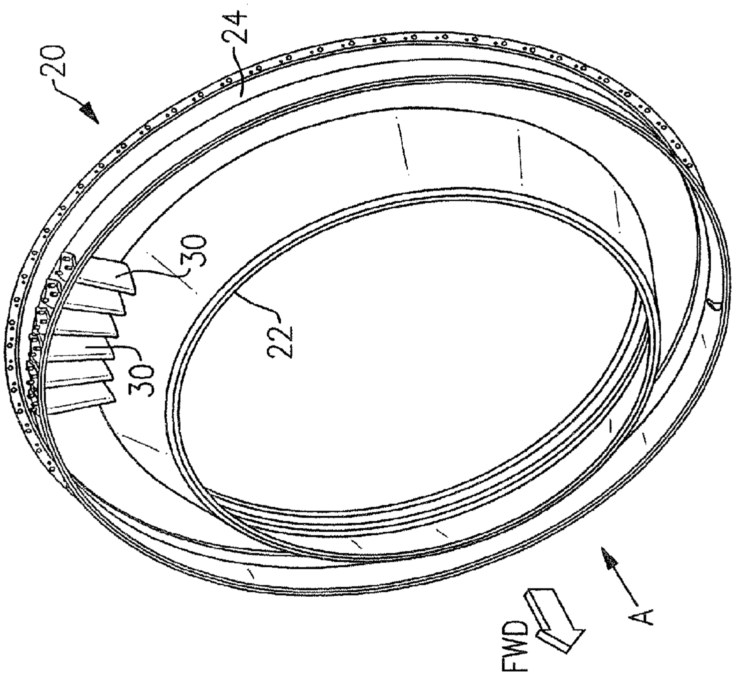
FIG. 2 is a perspective view of an exemplary embodiment of a first stage stator assembly of the compressor of the gas turbine engine of FIG. 1.

Referring now to FIGS. 2 and 3, the method disclosed herein for repairing an inner air seal will be described in reference to the repair of an inner air seal of a forward stator assembly 20 in the compressor 14 of the gas turbine engine 10. The stator assembly 20 includes a circumferentially extending inboard shroud 22, also commonly referred to as an inner case, a circumferentially extending outboard shroud 24, also commonly referred to as an outer case, circumscribing the inboard shroud 22, and a plurality of stator vanes 30. It is to be understood, however, that the method disclosed herein may have application in repair of other seals in the gas turbine engine, as well as seals in other rotary machines.

For purposes of simplifying the illustration, only a few of the plurality of stator vanes 30 are shown in FIGS. 2 and 3. However, it is to be understood that the plurality of stator vanes 30 extend generally radially between the outboard shroud 24 and the inboard shroud 22 at equal spaced intervals about the entire circumference of the stator assembly 20. In operation of the gas turbine 10, the stator vanes 20 direct the airflow passing through the stator assembly 20 into a rotor assembly (not shown) at a desired angle.

Each stator vane 30 has a vane root 32, a vane tip 34 and a vane airfoil portion 36 that extends between the vane root 32 and the vane tip 34. The vane tip 34 of each stator vane 30 is secured to the outboard shroud 24 and extends inwardly to the inboard shroud 22. At the inboard shroud 22, the vane root 32 of each stator vane 30 is received in a respective opening in the inboard shroud 22 with a tip portion 38 of the vane root 32 extending through the opening. Each stator vane 30 is secured in position by a retaining clip 28 that engages the tip portion 38 of the vane root 32 inboard of the inboard shroud 22.

The inboard shroud 22 is disposed coaxially about the central engine axis of the gas turbine engine 10. An inner airseal 40 extends circumferentially along is the inboard surface 26 of the inboard shroud 22. The inner airseal 40 includes a seal element 42 that provides a sealing surface 45 that lies in close proximity to one or more knife edge seal elements, shown a single knife sealing element 55 in FIG. 4, carried on the rotor assembly (not shown). In operation of the gas turbine engine 10, the tip of the knife edge sealing element(s) 55 will lie very close to or contact and even cut into the sealing surface 45, thereby providing a seal for reducing leakage of air from the air flow path through the compressor.

Figure 4:
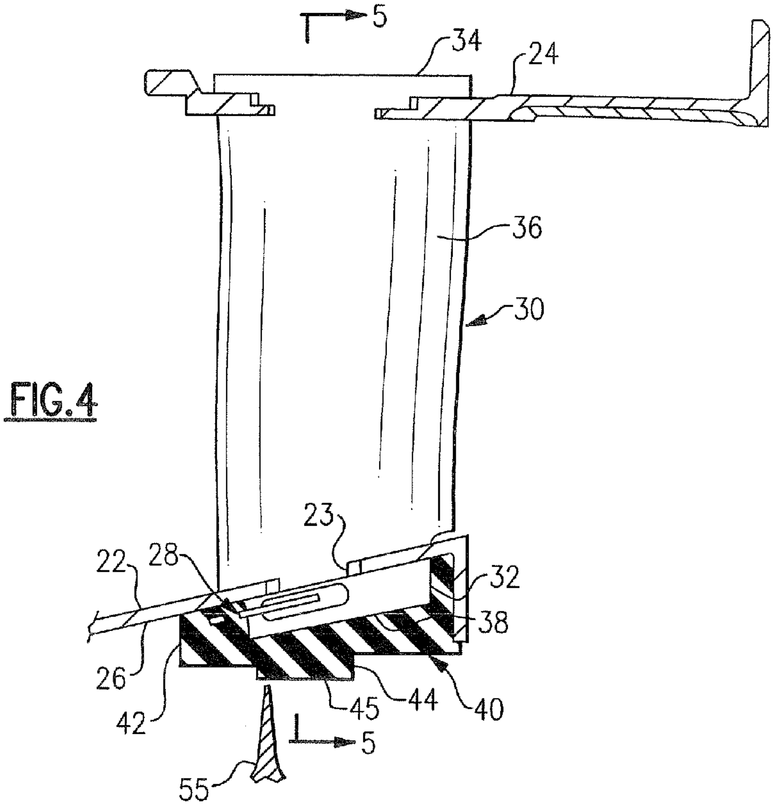
FIG. 4 is a sectioned elevation view taken generally along line 4-4 of FIG. 3 showing the inner air seal in original equipment manufacture condition.
Figure 5:
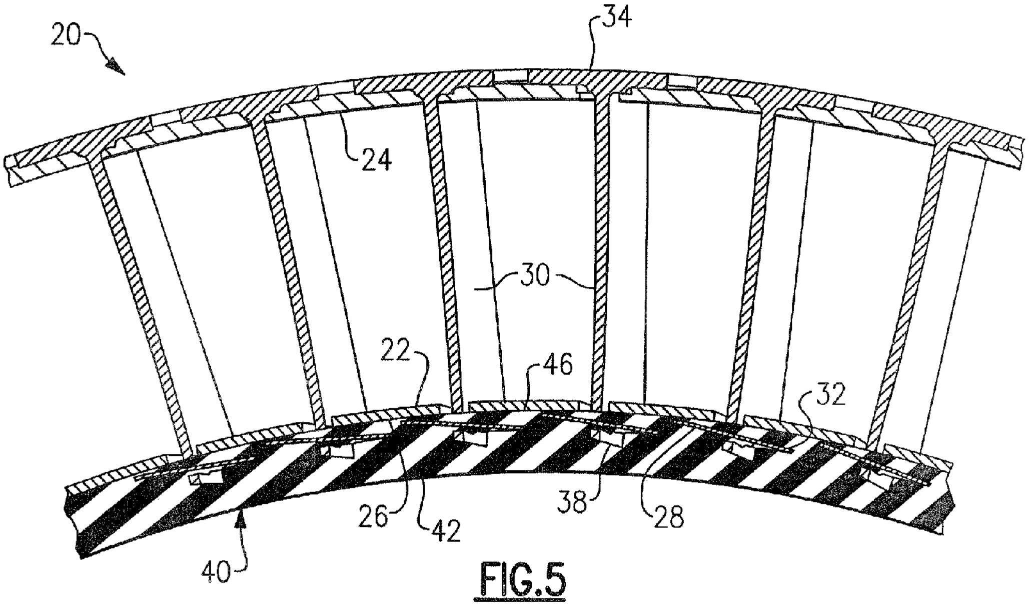
FIG. 5 is a sectioned elevation view taken generally along line 5-5 of FIG. 4.

Referring now to FIGS. 4 and 5, there is depicted an exemplary embodiment of the inner airseal 40, as installed in original equipment manufacture condition, associated with the first compression stage of a low pressure compressor of the gas turbine engine 10. The seal element 42 of the inner air seal 40 extends circumferentially along the inboard surface 26 of the inboard shroud 22, the inboard surface 26 of the inboard shroud 22 providing a substrate to which the seal element 42 is bonded. The seal element 42 may comprise a body formed of an elastomeric material, such as, for example but not limited to, silicone rubber. In original equipment manufacture, the body of the seal element 42 may be molded in place to a desired shape having a base surface 46 contoured to fit the substrate, i.e. the inboard surface of the inboard shroud 22, and a sealing surface 45 on an outwardly projecting portion 44 of the face of the seal element 42. The base surface 46 of the seal element 42 of the inner air seal may be bonded to the inboard surface 26 of the inboard shroud 22 about the inner circumference of the inboard shroud 22 using a suitable adhesive, such as, for example but not limited to, silicone based adhesive. In FIG. 4, the inner airseal 40 is shown in a first cross-section taken through a portion of the inner air seal lying directly beneath one of the stator vanes 30. As best seen in FIG. 4, the tip portion 38 of the vane root 32 that extends through the slot-like opening 23 in the inboard shroud 22 and the retaining clip 28 are encapsulated in the seal element 42.

Figure 6:
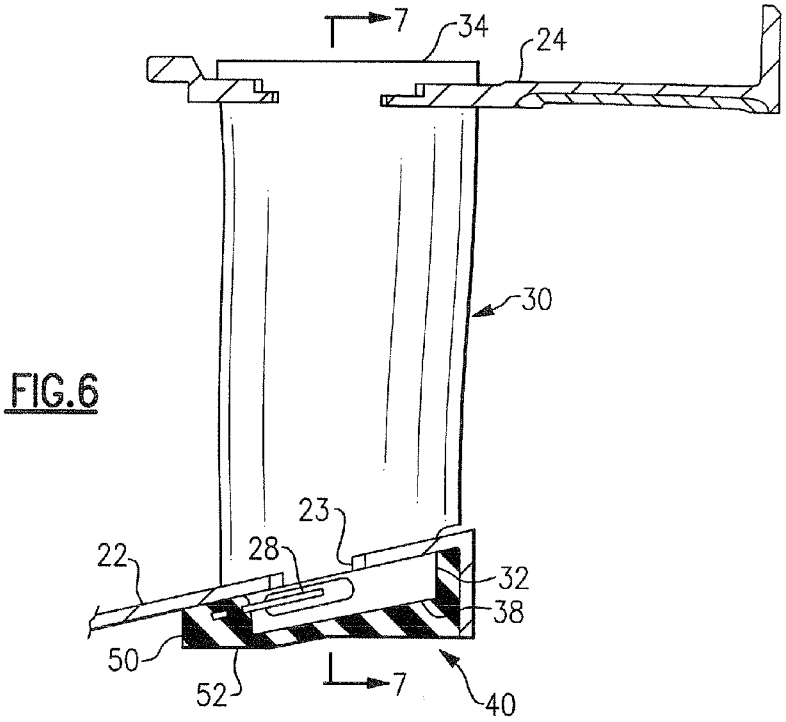
FIG. 6 is a sectioned elevation view of the inner seal assembly of FIG. 4 after a layer of damaged or worn material has been removed during repair in accordance with the method disclosed herein.

As noted previously, over time in service, the sealing surface 45 of the seal element 42 becomes worn and/or damaged by contact with the knife edge blade sealing element(s) 55 carried on the rotor assembly (not shown) as the rotor assembly rotates. To repair a worn and/or damaged inner airseal 40 in accord with the method disclosed herein, a portion of the seal element 42 that includes the worn and/or damaged portion of the material forming the seal element 42 of the inner airseal 40 is removed, retaining a layer 50 of the original, undamaged and unworn material forming the body of the seal element 42 of the inner airseal 40, as illustrated in FIG. 6. The retained layer 50 of the original, undamaged and unworn material remains securely bonded to the substrate provided by the inboard surface of the inboard shroud 22. The retained layer 50 is of sufficient thickness to still encapsulate the tip portion 38 of the vane root 32 that extends through the slot-like opening 23 in the inboard shroud 22 and the retaining clip 28 within the retained layer of the seal element 42.

Figure 7:
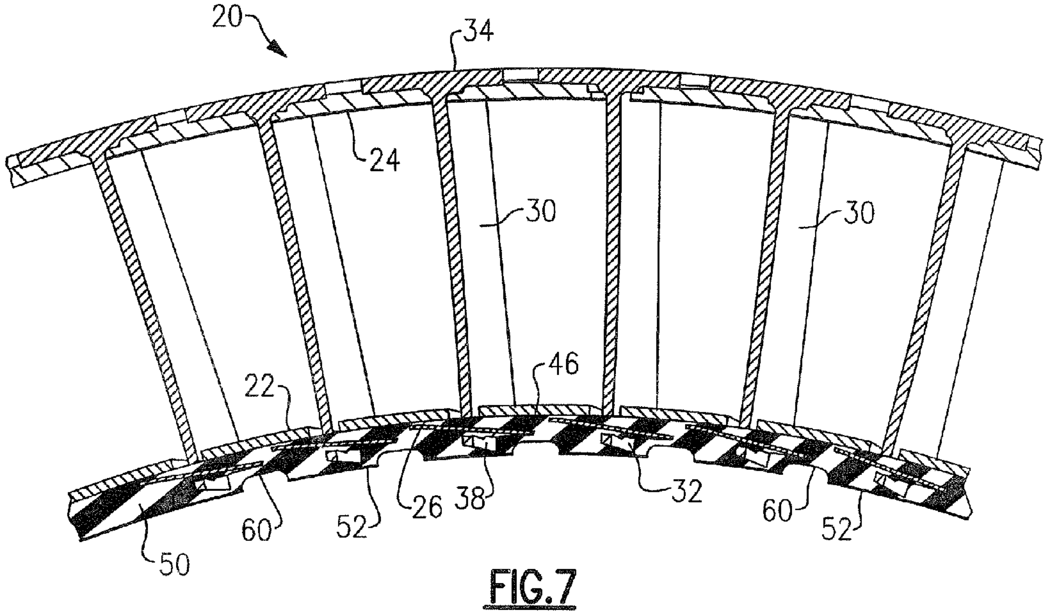
FIG. 7 is a sectioned elevation view of the inner air seal of FIG. 6 after crenellations have been formed in the retained layer of original material during repair in accordance with the method disclosed herein.

Once the damaged and worn material has been removed, for example by machining, a plurality of crenellations 60 are formed, for example by machining, in the exposed surface 52 of the retained layer 50 of the original, undamaged and unworn material as illustrated in FIG. 7. The plurality of crenellations 60 may extend in generally axial alignment from the forward edge to the aft edge that is across the axial width, of the retained layer 50 of the inner airseal 40. The plurality of crenellations 60 are formed in the retained layer 50 at circumferentially spaced intervals about the entire inner circumference of inner airseal 40. Each crenellation 60 may be a recess, pocket or channel forming a concave depression in the retained layer 50. In the embodiment illustrated in FIG. 7, the crenellations 60 comprise a plurality of generally flat-bottom channels machined into the retained layer of original material. It is to be understood that the crenellations 60 may also be formed as semi-circular grooves, as generally V-shaped grooves, as generally U-shaped grooves or as an elongated depression of other desired cross-section.

After the crenellations 60 have been formed in the retained layer 50, a replacement layer 70 of new material is applied over the retained layer 50 and bonded to the exposed surface 52 of the retained layer 50. The replacement layer 70 of new material may be molded to shape in place. For example, the replacement material may be injected into a mold (not shown) mated to the retained layer 50 and allowed to set up to form the outer replacement layer 70 of new material bonded to the retained layer 50. The mold may be configured to provide a face surface 72 on the replacement layer 70 that replicates the sealing surface 45 on the tip portion 44 of the original equipment manufacture seal element 42. Alternatively, the new material may be applied over the retained layer 50 by trowel, allowed to set up, and then machined to provide a desired face surface. The replacement layer 70 of new material may be self-adhering to the retained layer 50 of original material or a layer of adhesive may be applied to the exposed surface 52 of the retained layer 50.

Figure 10:
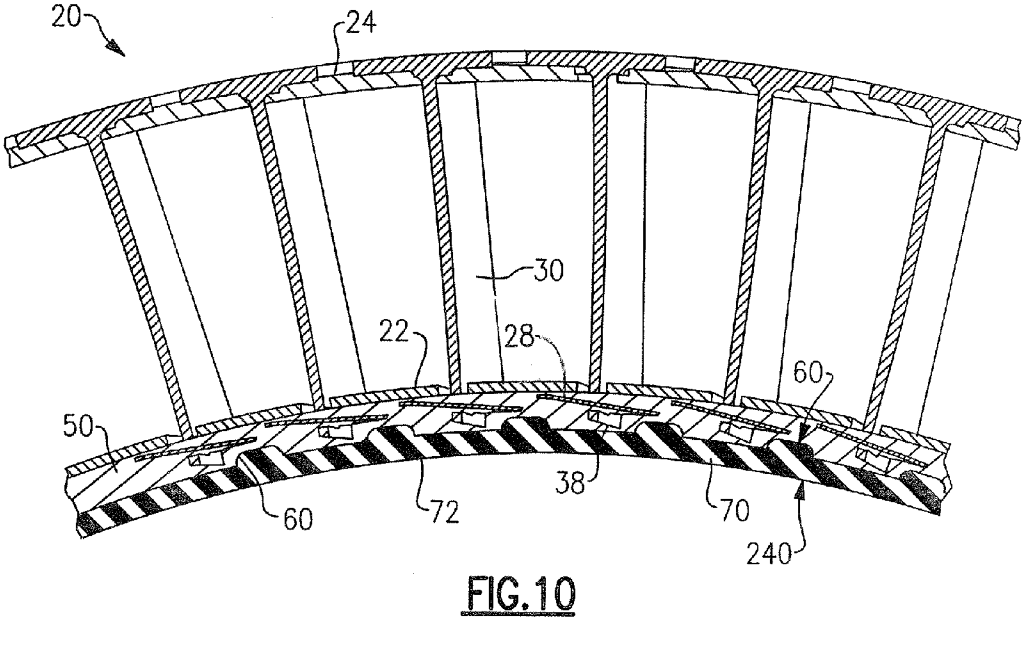
FIG. 10 is a sectioned elevation view of a circumferentially extending section of an inner air seal having a seal element formed in accordance with the method disclosed herein.
Figure 8:
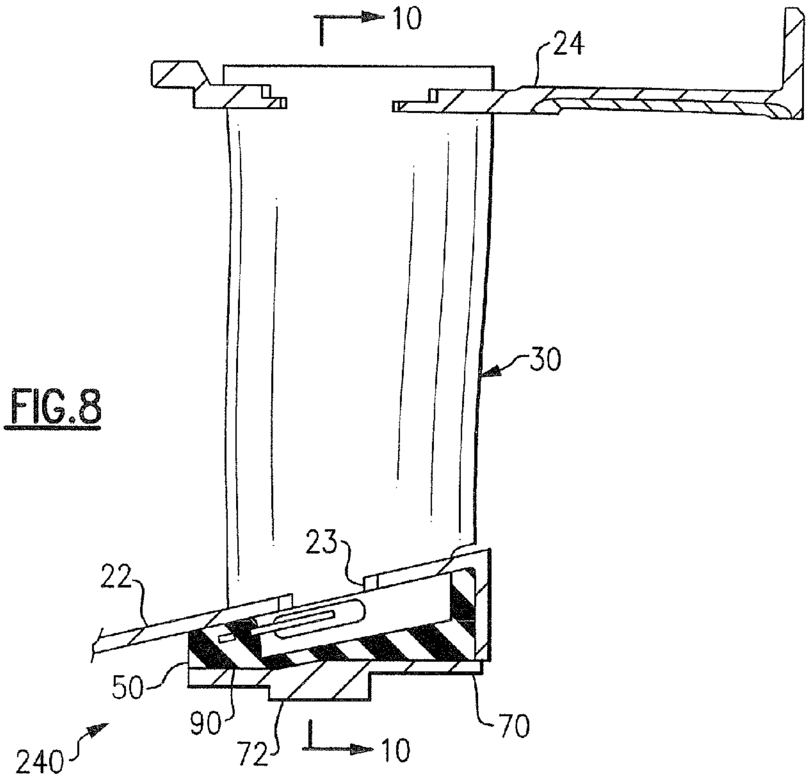
FIG. 8 is a sectioned elevation view taken generally along line 8-8 of FIG. 3 showing the inner air seal following repair in accordance with the method disclosed herein.
Figure 9:
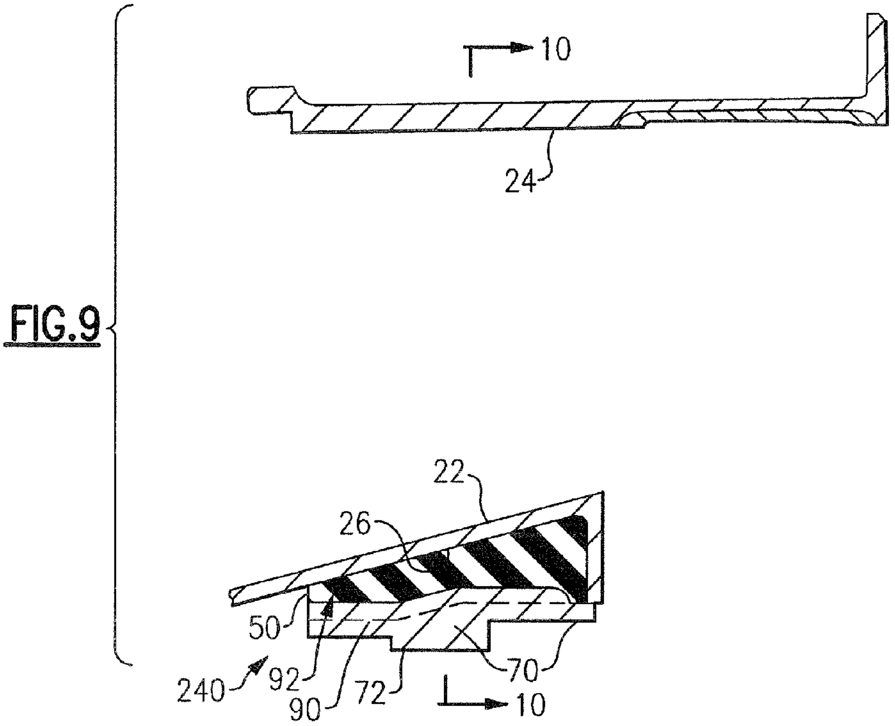
FIG. 9 is a sectioned elevation view taken generally along line 9-9 of FIG. 3 depicting a section of the inner air seal through a crenellation following repair in accordance with the method disclosed herein.

Referring now to FIGS. 8, 9 and 10, there is depicted an exemplary embodiment of a repaired inner airseal 240, which constitutes the original equipment manufacture inner air seal 40, shown in FIGS. 4 and 5, repaired in accordance with the method for repair disclosed herein. In FIG. 8, the repaired inner airseal 240 is shown in a first cross-section taken through a portion of the repaired inner air seal 240 lying directly beneath one of the stator vanes 30. The replacement layer 70 of new material is bonded to the retained layer 50 of original material along a bond line 90 commensurate with the surface of the retained layer 50 exposed after machining away of the damaged or worn material from the seal element. In FIG. 9, the repaired inner airseal 240 is shown in a second cross-section taken through a crenellation in a portion of the repaired inner air seal 240 lying intermediate a pair of stator vanes 30. At this location, the replacement layer 70 of new material is bonded to the retained layer 50 of original material along a bond line 92 commensurate with the surface of the retained layer 50 exposed after machining away original material in the retained layer 50 to form the crenellations 60. The sealing surface 72 on the replacement layer 70 of the repaired inner airseal 240 replicates the sealing surface 45 of the original equipment manufacture inner airseal 40.

In FIG. 10, a section of the circumferentially extending repaired inner airseal 240 is shown in a cross-section illustrating the placement of the crenellations 60 at circumferentially spaced intervals intermediate respective neighboring pairs of stator vanes 30. Forming the crenellations 60 in the exposed surface of the retained layer 50 of original material at locations intermediate respective neighboring pairs of stator vanes 30, rather than directly beneath the stator vanes 30, ensures that the tip portions of the roots of the stator vanes 30 and the retaining clips are not damaged during machining into the retained layer 50 to form the crenellations 60.

The crenellations 60, being cut into the retained layer 50, result in an increase in the total surface area of the substrate original material to which the replacement layer 50 of new material is bonded. Additionally, due to the presence of the crenellations 60, the bond surface does not follow a simple circumferential path at a uniform radius, but rather undulates between a two circumferential paths, one circumferential path following the surface of the retained layer 50 exposed upon removal of the layer of damaged or worn material from the original seal element 42 and the other circumferential path following along the bases 62 of the crenellations 60 formed in the retained layer 50. The resulting bond between the replacement layer 70 and the retained layer 50 is not only stronger due to the increased surface area associated with the bond, but also provides an anti-rotation resistance not present in bonds that follow a simple circumferential path as in conventional practice. The anti-rotation resistance arises from the undulating nature of the bond surface due to the presence of the crenellations 60 and provides resistance to circumferentially directed stresses arising from contact with the knife edge sealing elements carried on the rotor assembly as the knife edge sealing elements rotate along the stationary sealing surface 72 of the repaired inner airseal 240. The repaired inner airseal 240 can be distinguished from the original equipment manufacture inner airseal 40 by a witness line at the bond interface 90, 92, but will otherwise be indistinguishable in appearance and performance from the original equipment manufacture inner air seal 40.

Although the method of forming a seal element disclosed herein has been described with respect to the repair of an original equipment manufacture seal having a seal element damaged or worn over time, it is to be understood that the method disclosed herein may be applied to making an original seal element. For example, referring to FIG. 10, the inner airseal 240 may represent an original seal element manufactured by forming a layer 50 of a base material on a substrate surface, i.e. the inboard surface of the inboard shroud 22, forming a plurality of crenellations 60 in the face surface of the layer 50 of base material, and forming a layer of a seal material 70 on the crenellated layer 50 of base material. The layer 50 of base material may be bonded, either by self-adhesion or by a layer of adhesive, to the substrate surface. The layer 50 of base material is made thick enough to encapsulate the retaining clips 28. The method of forming the seal element may include the step of molding the layer 50 of base material in place on the substrate surface. The method of forming the seal element may include the step of molding the layer 70 of a seal material in place on the layer 50 of a base material having crenellations 60 formed therein. In an embodiment, the seal material may be an elastomeric seal material. The base material may be an elastomeric material or a non-elastomeric material suitable for supporting an elastomeric material.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiment as illustrated in the drawing, it will be recognized by those skilled in the art that various modifications may be made without departing from the spirit and scope of the invention. For example, although described herein with respect to an inner airseal of a stator assembly of a compressor on a gas turbine engine, the method of repair disclosed herein may be applied to similar seals on other types of rotary machines. Also, although described herein with respect to the repair of a seal element made of an elastomeric material, the method of repair disclosed herein may be applied to the repair of seal elements made of other materials, as well as seals that do not include clips.

Therefore, it is intended that the present disclosure not be limited to the particular embodiment(s) disclosed as, but that the disclosure will include all embodiments falling within the scope of the appended claims.

We claim:

1. A method for forming a seal element on a substrate surface comprising the steps of:

molding a layer of a base material on the substrate surface, the base material having an axial expanse, the substrate surface is an inboard surface of an inboard shroud of a stator assembly of a rotary engine, wherein the stator assembly comprises a plurality of vanes each having a root extending through the inboard surface of the inboard shroud, and wherein the step of forming the plurality of crenellations spaced by defined intervals in the face surface of the layer of the base material further comprises retaining a portion of the base material that encapsulates at least a portion of each of the roots of the plurality of vanes;

forming a plurality of crenellations spaced by defined intervals in a face surface of the layer of the base material such that each of the plurality of crenellations extend axially along the axial expanse of the base material and such that each of the plurality of crenellations are spaced at intervals intermediate respective neighboring pairs of the plurality of vanes; and forming a layer of an elastomeric seal material on the crenellated layer of base material.

2. The method as recited in claim 1 wherein the step of forming a layer of a seal material on the crenellated layer of a base material comprises the steps of:

applying a coating of an adhesive to an exposed surface of the layer of a base material having crenellations formed therein;

forming the layer of a seal material on the adhesive coated surface of the layer of a base material having crenellations formed therein.

3. The method as recited in claim 1 wherein:

the step of forming a layer of a base material on the substrate surface comprises removing a layer of seal material from a seal element formed of an original seal material while leaving behind a retained layer of original seal material as the layer of a base material on the substrate surface.

4. A method for repair of an inner airseal associated with a stator assembly on a gas turbine engine, the stator assembly having an inboard shroud with an inboard surface and a plurality of vanes, the inner airseal having a circumferentially extending seal element adhesively bonded to the inboard surface of the inboard shroud and formed of an original elastomeric material and having an axial expanse, the seal element having a sealing surface in a damaged or worn condition, the method comprising the steps of:

removing a layer of damaged or worn material from the original elastomeric material while leaving behind a retained layer of original material;

forming a plurality of crenellations spaced by defined intervals in a face surface of the retained layer of original elastomeric material such that each of the plurality of crenellations are positioned at intervals intermediate respective neighboring pairs of the plurality of vanes; and providing a replacement layer of new elastomeric material to the retained layer of original elastomeric material having crenellations formed therein.

5. The method as recited in claim 4 wherein the step of forming a plurality of crenellations in the retained layer of original elastomeric material comprises forming a plurality of crenellations in the retained layer of original elastomeric material extending generally axially across the axial expanse of the seal element.

6. The method as recited in claim 5 wherein each of the plurality of vanes has a root extending through the inboard surface of the inboard shroud, and wherein the step of forming a plurality of crenellations spaced by defined intervals in the face surface of the retained layer of original elastomeric material further comprises retaining a portion of the retained layer of original elastomeric material that encapsulates at least a portion of each of the roots of the plurality of vanes.

7. The method as recited in claim 4 wherein the step of providing a replacement layer of new elastomeric material to the retained layer of original elastomeric material having crenellations formed therein comprises the step of forming the replacement layer of new elastomeric material in place on the retained layer of original elastomeric material having crenellations formed therein, the new elastomeric material being self-adhering to the retained layer of original elastomeric material.

8. The method as recited in claim 4 wherein the step of providing a replacement layer of new elastomeric material to the retained layer of original elastomeric material having crenellations formed therein comprises the steps of:

applying a coating of an adhesive to an exposed surface of the retained layer of original elastomeric material having crenellations formed therein;

forming the replacement layer of new elastomeric material on the adhesive coated surface of the retained layer of original elastomeric material having crenellations formed therein; and providing a sealing surface on the replacement layer of new elastomeric material replicating the sealing surface of the seal element in an undamaged and unworn condition.

9. The method as recited in claim 8 wherein the step of forming the replacement layer of new elastomeric material on the adhesive coated retained layer of original elastomeric material having crenellations formed therein comprises molding a replacement layer of moldable elastomeric material onto the adhesive coated surface of the retained layer of original elastomeric material having crenellations formed therein.

10. A seal having a seal element comprising:

a layer of a base material adhesively bonded to a substrate and having a plurality of crenellations formed in a face surface of the layer of a base material, each of the plurality of crenellations being spaced by defined intervals in the face surface and extending axially along an axial expanse of the base material;

a layer of a seal material formed to the face surface of the layer of a base material having crenellations formed therein, the seal material filling the crenellations; and the seal element extends circumferentially about an inboard surface of an inboard shroud of a stator assembly of a gas turbine engine, wherein the stator assembly comprises a plurality of vanes each having a root extending through the inboard surface of the inboard shroud, and wherein the base material having the plurality of crenellations formed therein encapsulates at least a portion of each of the roots of the plurality of vanes.

11. The seal as recited in claim 10 wherein the layer of a seal material is self-adhering to the layer of a base material.

12. The seal as recited in claim 10 further comprising an adhesive layer applied between and bonding the layer of a seal material to the layer of a base material.

13. The seal as recited in claim 10 wherein the layer of a base material and the layer of a seal material are formed of a silicone rubber material.

* * * * *